INVENTOR.
HENRY HARRISON

United States Patent Office 3,536,567
Patented Oct. 27, 1970

3,536,567
HEAT SEALING AND COOLING MEANS
Henry Harrison, Locust Valley, N.Y., assignor to Halm Instrument Co., Inc., Glen Head, N.Y.
Filed Aug. 14, 1967, Ser. No. 660,379
Int. Cl. B32b 31/20
U.S. Cl. 156—498                        5 Claims

ABSTRACT OF THE DISCLOSURE

Apparatus for sealing and cooling plastic sheets comprising a continuously heated bar and a cool bar, each bar having elastic lips and a central slot which is connected to a source of valved air pressure. At least one of the bars is movably mounted with respect to the other to accommodate plastic sheets between them. To seal the sheets the heated bar is moved so that the elastic lips contact the sheets and form two air chambers. The air pressure is then valved to force the sheets into heat transfer relation with the heated bar and immediately thereafter the air pressure is reversed to force the sheets into cooling relation with the cool bar.

---

This invention relates to means for heat sealing and cooling plastic sheets.

One of the conventional ways to heat seal plastic sheets is to pulse electrical energy through a heater element in two heating bars. This requires expensive means for pulsing sufficient electrical energy and the operation is slow due to the heat and cooling cycle of the bars.

In the present invention one bar is continuously heated and the other bar is cool either at room temperature or continuously cooled. The cool bar may be stationary and the heating bar may move sufficiently in conventional manner to insert the plastic sheets, or vice versa. Each bar has a passageway at a central portion and the passageway is connected to a source of valved air pressure. Each bar has a pair of elastic lips so that when the bars come into proximity the lips grip the plastic sheets and form two air pockets.

During the heating portion of the cycle the air pressure forces the sheets into heat transfer relation with the heated bar and immediately thereafter the air pressure is reversed and forces the sheets into cooling relation with the cool bar.

This arrangement eliminates all expensive electrical pulsing equipment and provides a very fast cycle of operation.

In one modification of the invention, the elastic lips are eliminated and each bar has a flexible membrane across its own face so that the air pockets are formed between the face of each bar and its flexible membrane.

Accordingly a principal object of this invention is to provide new and improved heat sealing means for plastic sheets.

Another object of the invention is to provide new and improved heating and cooling means for sealing plastic sheets comprising one continuously heated bar and one continuously cool bar, each of said bars having a central air passage in its working face which is connected to a control source of air pressure. The air pressure being valved to force the sheets into heat transfer relation with the heated bar for sealing the sheets and then into cooling relation with the cool bar for cooling the seal.

Figure 1:
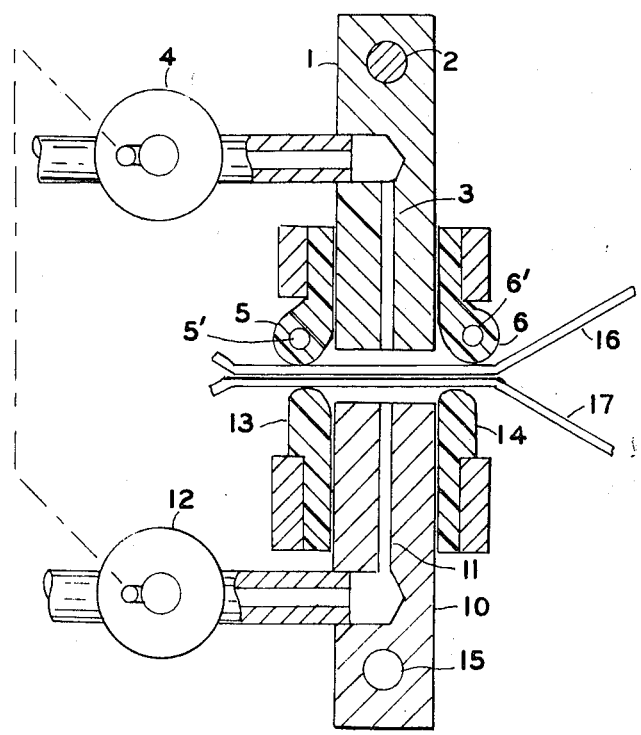
Figure 2:
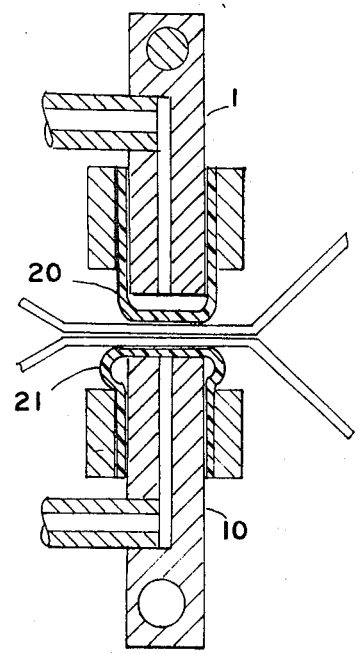

These and other objects of the invention will be apparent from the following specification and drawings of which:

FIGS. 1 and 2 are sectional views of embodiments of the invention.

Referring to FIG. 1 there is shown a heated bar 1 which is adapted to be heated by a heating element 2. The bar has a central slot or passageway 3 which is connected to a source of air pressure through valve 4. The bar has a pair of elastic or resilient lips 5 and 6 for instance of rubber which extend past the face of the bar. If desired the lips may be cooled through channels 5' and 6'.

The cool bar 10 similarly has a central slot 11 which is connected to a source of air pressure through valve 12. The bar 10 also has a pair of elastic or resilient lips 13 and 14 which extend past the face of the bar. The bar 10 may be stationary and may be operated at ambient temperature but may have a cooling channel 15. At least one of the bars is movably mounted with respect to the other so that a pair of plastic sheets 16 and 17 may be inserted between the bars.

In operation, after the sheets have been inserted between the bars, end upon movement of one or both bars then the sheets are gripped between the resilient lips forming a first air pressure pocket adjacent the heating bar and a second air pocket adjacent the cool bar to seal the sheets. The air pressure is valved so as to force the sheets into heat transfer relation with the heated bar. Immediately after the seal is formed, the air pressure is reversed, and the seal forced into cooling relation with the cool bar. Heat transfer relation is actually contact with the hot or cold bar or with a solid heat conducting intermediate layer. This layer may be a flexible membrane, as shown in FIG. 2, or it may be a solid non-stick material such as Teflon.

In this system the heating or cooling rate is continuously at a maximum, and the amount of heat required to make a seal is at a minimum. This results in a very fast sealing cycle.

FIG. 2 shows a modification of the invention wherein the elastic lips are eliminated and there are substituted a pair of flexible membranes 20 and 21 which may be a silicone rubber reinforced with glass fiber. The operation of this embodiment is the same as that described in connection with FIG. 1, the air pockets being formed between the surface of the bar and the membranes. In order to form the seal, the air pressure forces the sheets against the heating assembly and immediately after the seal, forces it against the cooling assembly, the membranes having good heat transfer capability. With this arrangement the bars themselves may be stationary and all of the motion provided by the membranes which are actuated by the air pressure. The edges of the bar are preferably rounded to prevent weakening at the edge of the seal.

In another modification of the invention only one of the bars has the valved air passage and elastic lips to form the air pocket.

For delicate sheets or tapes a thin flexible silicone and glass fiber membrane may be mounted over the faces of the sealing bars.

What is claimed is:
1. Means for heat sealing plastic sheets comprising a continuously heated bar,
a cool bar,
one of said bars being adapted to move relative said other bar,
a first pair of lips mounted on said heated bar and forming a first air pocket,
a second pair of lips mounted on said cool bar and forming a second air pocket,
each of said bars having an internal passageway,
said passageways being adapted to receive air under pressure,
said bars being normally separated to accommodate between them a pair of plastic sheets to be sealed,
said lips being adapted to be moved into contact with said sheets, and valve means connected to apply momentary air presure to said second air pocket to force said sheets into heat transfer relation with said heated bar to seal said sheets.

2. Apparatus as in claim 1 having valve means to apply air pressure to said first air pocket to force said sheets into cooling relation with said cool bar after said sheets are sealed.

3. Apparatus as in claim 1 wherein said air pockets are formed by a flexible membrane covering the face of each bar.

4. Apparatus as in claim 1 wherein said cool bar is at ambient temperature.

5. Apparatus as in claim 1 wherein said cool bar is continuously cooled.

References Cited

UNITED STATES PATENTS 2,621,704  12/1952  Langer _____ 156—311 X
3,332,204   7/1957  Frank _____ 156—311 X BENJAMIN A. BORCHELT, Primary Examiner W. T. RIFKIN, Assistant Examiner U.S. Cl. X.R.

156—282, 311, 381